Patented Mar. 3, 1931

1,794,538

UNITED STATES PATENT OFFICE

ROBERT C. PALMER AND JOHN L. BURDA, OF PENSACOLA, FLORIDA

PROCESS OF REVIVIFYING SPENT ADSORBENT MATERIALS

No Drawing.  Application filed November 25, 1929. Serial No. 409,750.

This invention relates to an improved process of revivifying spent adsorbent materials.

It is well known that adsorbent materials such as fuller's earth and other clays have a wide use in the art of clarifying, decolorizing and deodorizing liquids. In many of the cases where the adsorbents are used, it is an actual fact that the cost of the adsorbent material is greater than the value of the material being treated. On account, however, of the fact that these adsorbent materials can be cleansed or revivified without material losses, their use is economically practical. At the same time, since many of these products which are treated with adsorbent materials are of relatively low price, it is essential that the treatment with the adsorbent material and the revivification of the latter be carried out with the greatest economy.

In a revivification process for the reclamation of a spent adsorbent material, say fuller's earth, the bulk of the adsorbed impurities of the clay may be removed in a variety of ways; for instance, the clay may be heated to a high temperature, whereby many of the the impurities are either volatilized directly or are carbonized and subsequently volatilized; or the clay may be washed or extracted with an organic solvent for the adsorbed impurities. In most cases wherein it is possible to find a solvent for the adsorbed impurities, it is preferable to remove the impurities by washing methods, since under these conditions the removal of impurities can be carried out "in situ". It is to this latter method of purifying spent adsorbent materials that this invention relates.

In a process of revivification of a spent adsorbent material "in situ" despite the fact that many advantages are obtained, difficulties are introduced which must be overcome by very special methods. For instance, it is difficult to heat the mass indirectly by the use of jacket heat or directly through the use of internal coil heat on account of the poor thermal conductivity of the mass. It is also difficult to agitate the mass due to its consistency or to wash it effectively without agitation because of the tendency of the washing liquid to establish for itself certain channels instead of going through each and every pore.

In a process for cleansing spent adsorbent material which employs a solvent to dissolve the adsorbed impurities, the following steps are necessary: the dissolving of substantially all of the adsorbed impurities, the removal of the solution of the adsorbed impurities, the removal of any remaining solvent from the mass of adsorbent material and the removal of such other impurities in or on the adsorbent material as are not removed by the solvent or by subsequent washing steps. In most cases, also, the adsorbent material becomes contaminated with moisture derived either from the material being purified, from the impurities adsorbed on the surface of the adsorbent, or even from the solvent itself. As the presence of moisture acts detrimentally on the filtering properties of most adsorbent clays, the process of revivifying therefore involves in most cases the additional step of dehydrating the clay or adsorbent material. The carrying out of all these washing steps as heretofore proposed and particularly the removal of the last portions of the solvent and water from the adsorbent necessitate abnormally large recovery systems for the separation and reclamation of solvents.

The present invention is directly concerned with the removal of the last portions of the solvent and with the removal of water from the adsorbent material. This process is an improvement in that it enables the removal of water and also the last traces of the solvent to be effected in a thorough manner. For the combination of results, that is, the removal of both the solvent and the water, it is necessary that the solvent have certain limiting physical properties as described later. Depending upon the nature of the solvent used, the present process is applicable for removal of final traces thereof along with the water; but regardless of the limitation as to the solvent, the removal of water alone can always be effected by this process.

The hitherto proposed methods for the removal of the water from the adsorbent are by drying it in either of the following general ways: First, the blowing of steam through the filter to remove solvents, followed by heated air to remove adsorbed moisture and also final steam vapor; second, the blowing of steam through the filter to remove solvent, followed by removal of the clay from the vessel and calcinating to remove moisture. The former method on a large scale is impractical for the reason that when air is used, the length of time consumed by the step is excessive because of the low specific heat of air. The method of calcination necessitates the transfer of the adsorbent material to a calcination furnace, since, the construction of a filter bed and a calcination furnace being fundamentally different, they cannot be combined practically in a single apparatus.

In all of these prior methods there are introduced difficulties due to caking, channeling and other mechanical troubles, which to a large extent are absent in our improved process.

It is therefore an object of this invention to provide an improved process for the revivification of spent adsorbent material whereby adsorbed impurities and water may be efficiently removed therefrom.

Other and further important objects of this invention will become apparent from the following description and appended claims.

Our method of removing water consists of displacing from the mass of adsorbent material the solvent used for dissolving the adsorbed impurities, termed by us solvent A, by another liquid, hereinafter referred to as fluid B. Said fluid B is immiscible with water, and preferably has a boiling point above that of water. Fluid B is introduced under pressure at a temperature above its normal boiling point, and after all of solvent A has been displaced, the pressure is released, whereby part of fluid B together with all traces of moisture are distilled over. If the fluid B is so chosen that it also boils above the boiling point of solvent A, the last traces of the latter are also carried off when the pressure is released. Of course, it is not absolutely necessary that fluid B boil above either water or solvent A. It is sufficient if fluid B forms with either water or solvent A a mixture the boiling temperature of which is below that of pure fluid B.

More particularly, the present process is operated as follows: After the removal of the adsorbed impurities from the adsorbent material by the use of a solvent for said impurities, followed, if necessary, by a washing with more of the same solvent to remove dissolved impurities from the filter bed, the bulk of solvent A is removed by displacement thereof from the voids by fluid B. This fluid is so chosen that it boils above solvent A. For most practical purposes the same organic solvent which is used to dissolve the material being purified is employed as fluid B. For instance, where rosin is being purified by filtering a gasoline solution of the same through fuller's earth, it is highly advantageous to use gasoline as fluid B. Fluid B is preferably heated to or above the boiling point of the mixture formed, whereby on account of the relation of the boiling points of fluid B, solvent A and water, the latter two are distilled away. It is preferable to introduce fluid B into the filter bed or tower at an elevated temperature. Additional heating may take place by means of an immersed coil in the filter bed.

However, for the best working conditions fluid B is heated externally of the filter bed above its boiling point under pressure and then pumped through the filter bed until the contents of the bed or tower have reached the same temperature as fluid B initially. So much heat is thus stored that when the pressure is slowly released on the top of the bed or tower, distillation takes place in sufficient amount to distill off solvent A and water. Although solvent A and water may be removed by the obtaining of heat from a heating coil immersed in the filter tower, it has been found after considerable large-scale study that the heat is best supplied in the form of superheat stored in fluid B.

Although in the preferred form of this invention the removal of solvent A and water is effected in a tower in which the voids are filled with fluid B in liquid form, such removal may be effected by merely blowing the superheated vapors of fluid B through the tower. This latter method, however, of working under conditions wherein the voids are not filled with liquid is, to a certain extent, open to similar objections to those raised against the method of drying with other gases (air, steam) except for the fact that where, as suggested above, fluid B is the same as used to dissolve the material being purified, the last of fluid B does not have to be removed before the filter bed is ready for reuse.

This invention in its specific and preferred form will now be more fully described in conjunction with the revivification of fuller's earth that has been used for decolorizing rosin. The filter bed or tower containing the spent fuller's earth, saturated with absorbed impurities and also containing some rosin solution, is flushed out with petroleum naphtha (that is, a solvent which is generally used for dissolving rosin) to remove such rosin from the tower as is in solution in the petroleum naphtha.

The filter bed is then soaked with hot alcohol, or with such other solvents as are disclosed in the copending application of Palmer, Serial No. 242,516, filed December 24, 1927, or with acetone, or any other solvent for the absorbed material on the fuller's earth. These solvents correspond to the above referred to solvent A. This solution of impurities is flushed out with more of solvent A or until practically all of the absorbed impurities in the fuller's earth have been dissolved away from the earth.

Heated petroleum naphtha (boiling point range 100° to 160° C.) at a temperature of about 130° to 150° C. or higher and under a pressure of above 25# gage pressure, preferably 30#, is then pumped into the tower, where it serves the dual function of heating the mass of the tower and contents and at the same time flushing out the bulk of solvent A. This petroleum naphtha corresponds to the above referred to fluid B. At this point the filter tower is maintained under pressure. When the contents of the filter bed, that is, fuller's earth and the liquid in the voids, has been heated to about 130° C., as can be determined by taking the temperature of the overflow from the filter tower, pumping is stopped and the release pressure valve on top of the tower is opened slightly. The residual solvent A and water distill off and are condensed and passed to their proper recovery system.

By working in this manner the adsorbent material in the filter bed is freed from practically all of the solvent A and water and is now ready without further treatment for use in purifying further amounts of rosin solution. Since the voids of the earth are filled with petroleum naphtha, which is the preferred solvent for the rosin material, the fuller's earth does not have to be freed from fluid B.

By the use of our process the water and solvent A can be removed in a more efficient manner than by any previously described method, not only because of a substantial saving in the labor necessary for the reclamation of large amounts of washing solvents but also because the filter bed is left in an excellent condition for reuse; that is, free from channeling effect or caking of material and in a uniform state.

Of course, the temperatures and pressures mentioned in the specific example are not limiting factors to the operativeness of this invention. It is evident that the higher the temperature and pressure of fluid B, the faster the drying and evaporation of solvent A. In actual practice we have used temperatures of 130° to 150° C., and pressures of 25# to 40# gage. In general, the limits as to temperature and pressure are not determined by the operativeness of our process, but merely by the safety factor of the apparatus used.

It will be further understood, that although we have pointed out above certain advantages in choosing for fluid B the same substance which is used to dissolve the material being purified, other materials may be used without necessarily sacrificing these advantages. All that is necessary is that fluid B be such that its last traces are not detrimental to the material being purified and do not act to dissolve the impurities which are to be adsorbed or in any other way impair the adsorptive powers of the clay.

Thus, in the above specific instance, toluene or xylene may be used as fluid B without losing the advantage of not having to sweep out the last traces thereof; because neither toluene nor xylene will act chemically and detrimentally upon the rosin. However, solvents of this class are better solvents for the rosin impurities than petroleum naphtha, and while not solvents for the impurities once adsorbed on the clay would tend to a certain extent to prevent adhesion. For this reason we do not recommend these as preferred solvents except under favorable economic conditions. Similarly, di-isobutylene, di-isoamylene, di-isopropylethylene, and other polymerized olefines of the same class are suitable for use as fluid B. They are, however, inferior to petroleum naphtha, because of their tendency to polymerize under the action of fuller's earth.

In general, the following limitations are placed upon fluid B. It should be substantially insoluble in water, and should be stable toward the adsorbent material under the conditions obtaining. Solvent A is limited by the conditions that it dissolve the adsorbed impurities in the adsorbent material and that it have a boiling point below fluid B, or else that it will form with it a mixture boiling lower than the boiling point of fluid B. Both fluids A and B are organic materials.

As already stated above, there may be conditions in which solvent A cannot be removed from the adsorbent in the manner described on account of the relation of its boiling point to that of fluid B. This improvement then becomes applicable merely for the complete removal of water from the adsorbent, and solvent A will then have to be removed by other than distilling methods.

We are aware of the fact that boiling mixtures of solvents, non-miscible with water, have been used to remove water from substances containing admixed water by vaporizing the solvent mixtures to sweep off the water. We do not believe, however, that such a method as is herein described has been used, with the resultant advantages enumerated, viz., that it leaves the filter bed in an excellent physical condition for further use and that as an added feature it is capable of removing the last portions of a solvent like solvent A.

We are aware that numerous details of the process may be varied through a wide range without departing from the principles of this invention, and we, therefore, do not purpose limiting the patent granted hereon otherwise than necessitated by the prior art.

We claim as our invention:

1. The process of removing water from fuller's earth, which comprises treating the fuller's earth with a substantially anhydrous liquid immiscible with water, at a temperature above the normal initial boiling point of the liquid and under pressure, and then reducing the pressure to vaporize part of the anhydrous liquid together with the water contained in the earth.

2. The process of removing water from a mass of fuller's earth, which comprises treating the fuller's earth with a petroleum fraction at a temperature above its normal minimum boiling point and at a pressure sufficient to prevent its boiling, and then reducing the pressure to vaporize part of the petroleum fraction together with the water.

3. The process of removing water from a mass of fuller's earth, which comprises treating the fuller's earth with petroleum naphtha at a temperature above 130° C. and at a pressure above 25# gage and then releasing the pressure to evaporate part of the naphtha together with the water.

4. The process of removing water from a mass of fuller's earth, which comprises treating the fuller's earth with petroleum naphtha at a temperature of 130° to 150° C. and at a pressure of about 30# gage and then releasing the pressure to evaporate part of the naphtha together with the water.

5. In the process of revivifying fuller's earth which has been used in the purification of rosin and which is contaminated with rosin impurities by treating the earth with a solvent for the impurities contaminating the earth, the step of displacing said solvent with an anhydrous liquid immiscible with water, at a temperature above the normal initial boiling point of said anhydrous liquid and under a pressure sufficient to maintain said anhydrous liquid in a liquid condition and then releasing the pressure.

6. In the process of revivifying fuller's earth which has been used in the purification of rosin and which is contaminated with rosin impurities by treating the fuller's earth with a solvent for said contaminating impurities, the step of displacing said solvent and impurities with a petroleum fraction at a temperature above the normal initial boiling point of said fraction and under a pressure sufficient to maintain said fraction in liquid condition and then releasing the pressure.

7. In the process of removing adsorbed impurities retained in fuller's earth after filtering therethrough a petroleum solution of rosin and extracting the impurities with a solvent therefor, the step of forcing under pressure into the mass of fuller's earth and solvent remaining therein a second heated solvent similar to that used for dissolving the rosin, whereby a mixture of said solvents and impurities is formed at a temperature above the normal boiling point of said mixture and releasing the pressure on said mixture to thereby distill off from the fuller's earth all of said first named solvent and a portion of said second named solvent.

In testimony whereof, we have hereunto subscribed our names at Pensacola, Escambia County, Florida.

ROBERT C. PALMER.
JOHN L. BURDA.